Dec. 13, 1927.
C. C. FUNK ET AL
MECHANICAL RADIATOR ORNAMENT FOR VEHICLES
Filed May 27, 1927
1,652,775
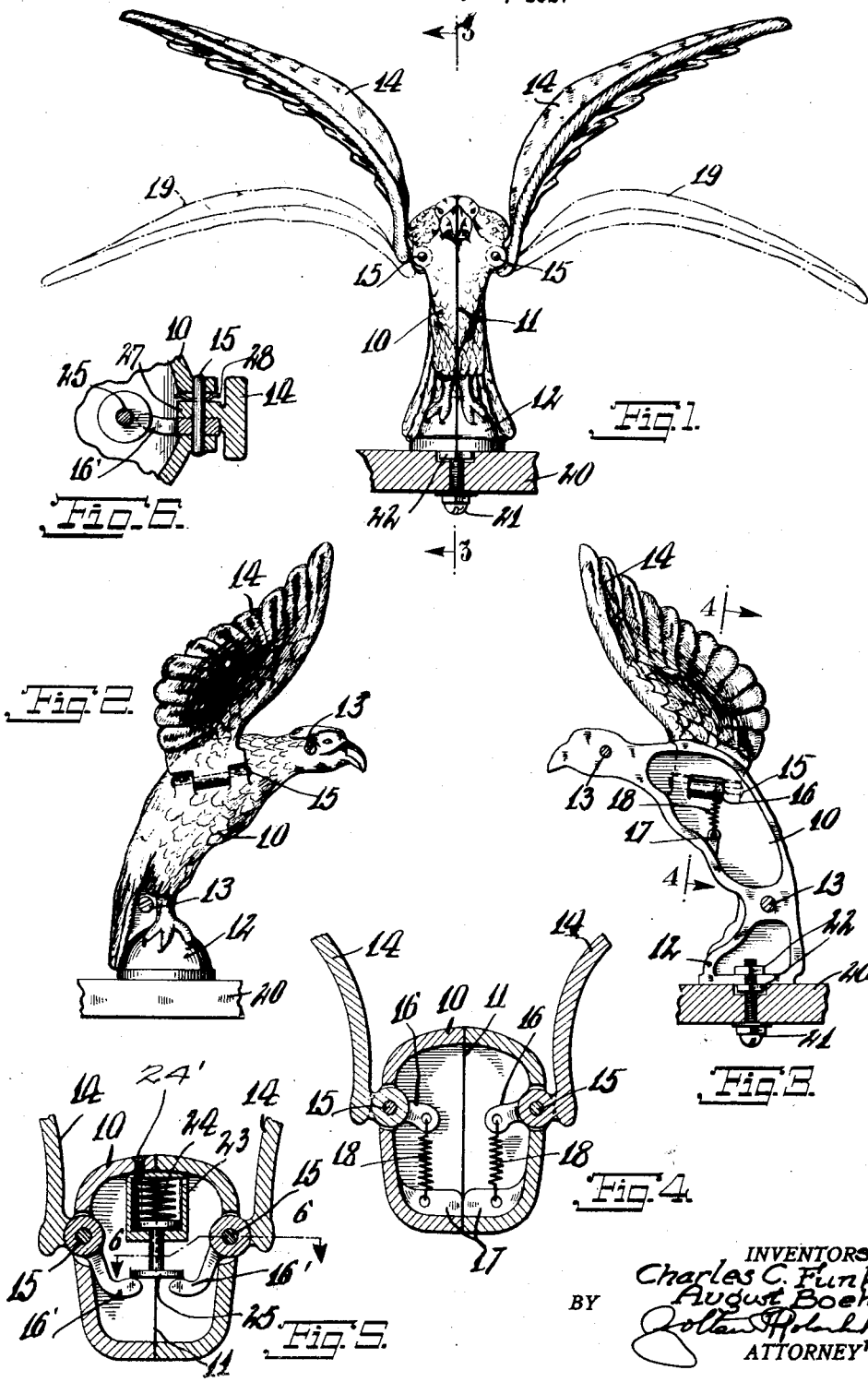
INVENTORS
Charles C. Funk
August Boehm
BY
ATTORNEY Patented Dec. 13, 1927.

1,652,775

UNITED STATES PATENT OFFICE.

CHARLES C. FUNK, OF BROOKLYN, AND AUGUST BOEHM, OF NEW YORK, N. Y.

MECHANICAL RADIATOR ORNAMENT FOR VEHICLES.

Application filed May 27, 1927. Serial No. 194,724.

This invention relates generally to novelties, and has more particular reference to a mechanical radiator ornament for motor vehicles.

The invention has for an object, the provision of a mechanical radiator ornament for vehicles, which is of novel construction and of attractive appearance, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

Referring to the accompanying drawing, forming a material part of this disclosure:

Fig. 1 is a front view of a device constructed according to this invention, and shown applied to a fragmentary sectional portion of a vehicle radiator.

Fig. 2 is a side view thereof.

Fig. 3 is a central vertical sectional view, taken on the line 3—3 of Fig. 1.

Fig. 4 is a fragmentary sectional view, taken on the line 4—4 of Fig. 3.

Fig. 5 is a view similar to Fig. 4 but disclosing a modification of the invention.

Fig. 6 is a sectional view, taken on the line 6—6 of Fig. 5.

The reference numeral 10 indicates generally an eagle's body split in the center, as at 11, and standing on a semi-spherical member 12. Screws 13 serve to hold the split parts together, and these parts are of hollow construction. Eagle wings 14 are pivotally arranged on the outer sides of the body 10, by means of pintle pins 15. Integral tongues 16 project from the wings 14 into the hollow portion of the said body. Ridges 17 project from the said body into the hollow portion, and springs 18 act between the tongues 16 and the ridges, normally urging the wings to assume the position shown in Fig. 1. These springs are of such strength that the wings 14 will flap into the position shown by the dot-dash lines 19 in Fig. 1, when a vehicle carrying the device on its radiator, vibrates due to irregularities on the road, and thus simulate a flying bird. A fragmentary portion 20 of the vehicle radiator is shown, and screw 21 together with nuts 22 hold the device in place. Obviously as the vehicle vibrates the wings 14 continuously move as though the eagle was flying.

The modification of the invention illustrated in Figs. 5 and 6, discloses a cylinder 23 fastened by screw 24' to one of the parts of body 10, an expansion spring 24 within the cylinder normally urging a piston arrangement 25 downwards, and tongues 16' engaged beneath the piston arrangement 25, the spring 24 being of such strength as to just balance the wings 14 in uppermost position and vibration being capable of flapping the wings. The tongues 16' and the wings 14 are separate pieces, both pivotally arranged on pintle pins 15. The adjacent faces of the wings and tongues are roughened, as indicated by numeral 27, and springs 28 acting between the body 10 and wings 14, normally hold these parts engaged. The wings 14 may be manually forced against the springs 28 so that the roughened surfaces 27 disengage, and the relative position of the wings and tongues 16' may be changed to normally place wings 14 in any desired position. Upon releasing the wings 14, the springs 28 act to reengage the wings 14 to the tongues 16'.

While we have illustrated and described the preferred form, construction, and arrangement of the several elements employed, it will be understood that the device is, nevertheless, susceptible of considerable modification therein, and we therefore reserve the privilege of resorting to all such changes as may be fairly embodied within the spirit and scope of the invention as claimed.

Having thus described our invention, what we claim as new and desire to secure by United States Letters Patent is:

1. A mechanical radiator ornament for vehicles, comprising an eagle's body of hollow construction, split at its center, the split parts being held together by screws, wings pivotally arranged on the outer sides of the eagle's body, tongues adjustably connected with the wings and projecting into the said hollow portion, means acting against the tongues to normally balance the wings in a certain position, and means for adjusting the tongues to thereby vary the position of the wings.

2. A mechanical radiator ornament for vehicles comprising a hollow body portion simulating a bird's body and having a recess in each side thereof, flanges on the sides of said body adjacent the ends of said recesses, a pin rigidly mounted at its extremities on adjacent pairs of flanges, wings comprising a boss having teeth on the side thereof journaled on each of said pins, actuating levers disposed in said hollow urging said wing to an upwardly inclined position comprising a boss having teeth formed in the side thereof pivotally mounted on each of said pins, and spring members each disposed between the boss of said wing and one of said flanges for urging the former in the direction of the boss of said actuating lever for engaging said teeth to retain said wings in an adjusted angular position.

3. A mechanical radiator ornament for vehicles comprising a hollow body portion simulating a bird's body and having a recess in each side thereof, flanges on the sides of said body adjacent the ends of said recesses, a pin rigidly mounted at its extremities on adjacent pairs of flanges, wings comprising a boss having teeth on the side thereof journaled on each of said pins, actuating levers disposed in said hollow urging said wing to an upwardly inclined position comprising a boss having teeth formed in the side thereof pivotally mounted on each of said pins, spring members each disposed between the boss of said wing and one of said flanges for urging the former in the direction of the boss of said actuating lever for engaging said teeth to retain said wings in an adjusted angular position, a cylinder mounted in said body, a plunger slidably mounted in said cylinder engaged against the inner ends of said actuating levers, and a spring disposed in said cylinder for urging said plunger downwardly to resiliently retain said wings in an upwardly inclined position and adapted to permit the wings to flap when said vehicle vibrates.

In testimony whereof we have affixed our signatures.

CHARLES C. FUNK.
AUGUST BOEHM.